United States Patent
Peters et al.

(10) Patent No.: US 11,723,298 B2
(45) Date of Patent: Aug. 15, 2023

(54) EFFICIENT USE OF PLANT PROTECTION AGENTS, NUTRIENTS, AND THE LIKE IN THE GROWING OF CULTIVATED PLANTS

(71) Applicant: BASF Agro Trademarks GmbH, Ludwighafen am Rhein (DE)

(72) Inventors: Ole Peters, Düsseldorf (DE); Tobias Menne, Cologne (DE); Alexei Melnitchouck, Calgary (CA)

(73) Assignee: BASF Agro Trademarks GmbH

(*) Notice: Subject to any disclaimer, the term of this patent is extended or adjusted under 35 U.S.C. 154(b) by 0 days.

(21) Appl. No.: 16/332,833

(22) PCT Filed: Sep. 11, 2017

(86) PCT No.: PCT/EP2017/072739
§ 371 (c)(1),
(2) Date: Mar. 13, 2019

(87) PCT Pub. No.: WO2018/050592
PCT Pub. Date: Mar. 22, 2018

(65) Prior Publication Data
US 2019/0357420 A1 Nov. 28, 2019

(30) Foreign Application Priority Data

Sep. 16, 2016 (EP) .................................... 16189255

(51) Int. Cl.
*G06F 16/29* (2019.01)
*A01B 79/00* (2006.01)
*G06V 20/10* (2022.01)

(52) U.S. Cl.
CPC ............ *A01B 79/005* (2013.01); *G06F 16/29* (2019.01); *G06V 20/188* (2022.01)

(58) Field of Classification Search
CPC .. A01B 79/005; G06F 16/29; G06K 9/00657; G06V 20/188; G06Q 50/02; A01M 7/00
USPC ......................................................... 382/211
See application file for complete search history.

(56) References Cited

U.S. PATENT DOCUMENTS

| | | |
|---|---|---|
| 5,915,313 A | 6/1999 | Bender et al. |
| 6,199,000 B1 | 3/2001 | Keller et al. |
| 2004/0034450 A1 | 2/2004 | Seal et al. |
| 2006/0282228 A1 | 12/2006 | Avey et al. |

(Continued)

FOREIGN PATENT DOCUMENTS

| | | |
|---|---|---|
| WO | WO-0023937 A1 | 4/2000 |
| WO | WO-2015193822 A1 | 12/2015 |
| WO | WO-2016090212 A1 | 6/2016 |

OTHER PUBLICATIONS

International Search Report for PCT/EP2017/072739 dated Oct. 17, 2017.

(Continued)

*Primary Examiner* — Stephen P Coleman
(74) *Attorney, Agent, or Firm* — Lowenstein Sandler LLP

(57) ABSTRACT

The present invention relates to the efficient use of application agents in the cultivation of crop plants. Based on application-agent-specific information and information on a partial-area-specific requirement of a field for the application agent, a partial-area-specific and application-agent-specific application map is prepared that indicates for individual partial areas of the field whether and how the application agent is to be used.

12 Claims, 1 Drawing Sheet

(56) References Cited

U.S. PATENT DOCUMENTS

| | | | |
|---|---|---|---|
| 2006/0290933 A1* | 12/2006 | Holm | G01N 21/255 356/416 |
| 2009/0132132 A1 | 5/2009 | Peterson et al. | |
| 2012/0109614 A1 | 5/2012 | Lindores | |
| 2014/0067745 A1* | 3/2014 | Avey | G06N 5/02 706/46 |
| 2014/0365083 A1* | 12/2014 | Covely | E02D 1/04 701/50 |
| 2015/0067665 A1* | 3/2015 | Thomas | G06F 8/65 717/168 |
| 2016/0171680 A1 | 6/2016 | Lobell | |
| 2016/0239709 A1* | 8/2016 | Shriver | G06K 9/00657 |
| 2018/0295771 A1 | 10/2018 | Peters | |

OTHER PUBLICATIONS

Written Opinion of the International Searching Authority for PCT/EP2017/072739 dated Oct. 17, 2017.
U.S. Appl. No. 16/307,967, filed Dec. 7, 2018.
U.S. Appl. No. 16/311,191 filed Dec. 19, 218.
U.S. Appl. No. 16/327,065, filed Feb. 21, 2019.
U.S. Appl. No. 16/332,842, filed Mar. 13, 2019.
Federle, et al., "Pesticide Application Manager ( PAM)—Decision Support in Crop Protection Based on Terrain-, Business- and Public data", Proceedings International Conference of Agricultural Engineering, Jul. 6-10, 2014, pp. 1-8.
Johnen, et al., "The proPlant Decision Support System: Phenological Models for the Major Pests of Oilseed Rape and Their Key Parasitoids in Europe", Biocontrol-Based Integrated Management of Oilseed Rape Pets, Spriner Science & Business Media, ed. Ingrid H. Williams, 2010, pp. 381-403.
Moran, et al., :Opportunities and limitations or image-based remote sensing in precision crop manaement, Remoe Sensing of Environment, vol. 1, Issue 3, Sep. 1997, pp. 319-346.
Newe, et al., :proPlant Expert.com—an online consultation system on crop protection in cereals, rape, potatoes and suarbeet:, Bulletin OEPP EPPO Bulletin, vol. 33, Issue 3, Dec. 2003, pp. 443-449.
Scheiber, et al., "Vereinfachung des Pflanzenschutzprozesses durch Datenintegration und Automation- Das Projekt PAM", 35th GIL-Jahresstagung 2015, Feb. 2015, pp. 161-164.

\* cited by examiner

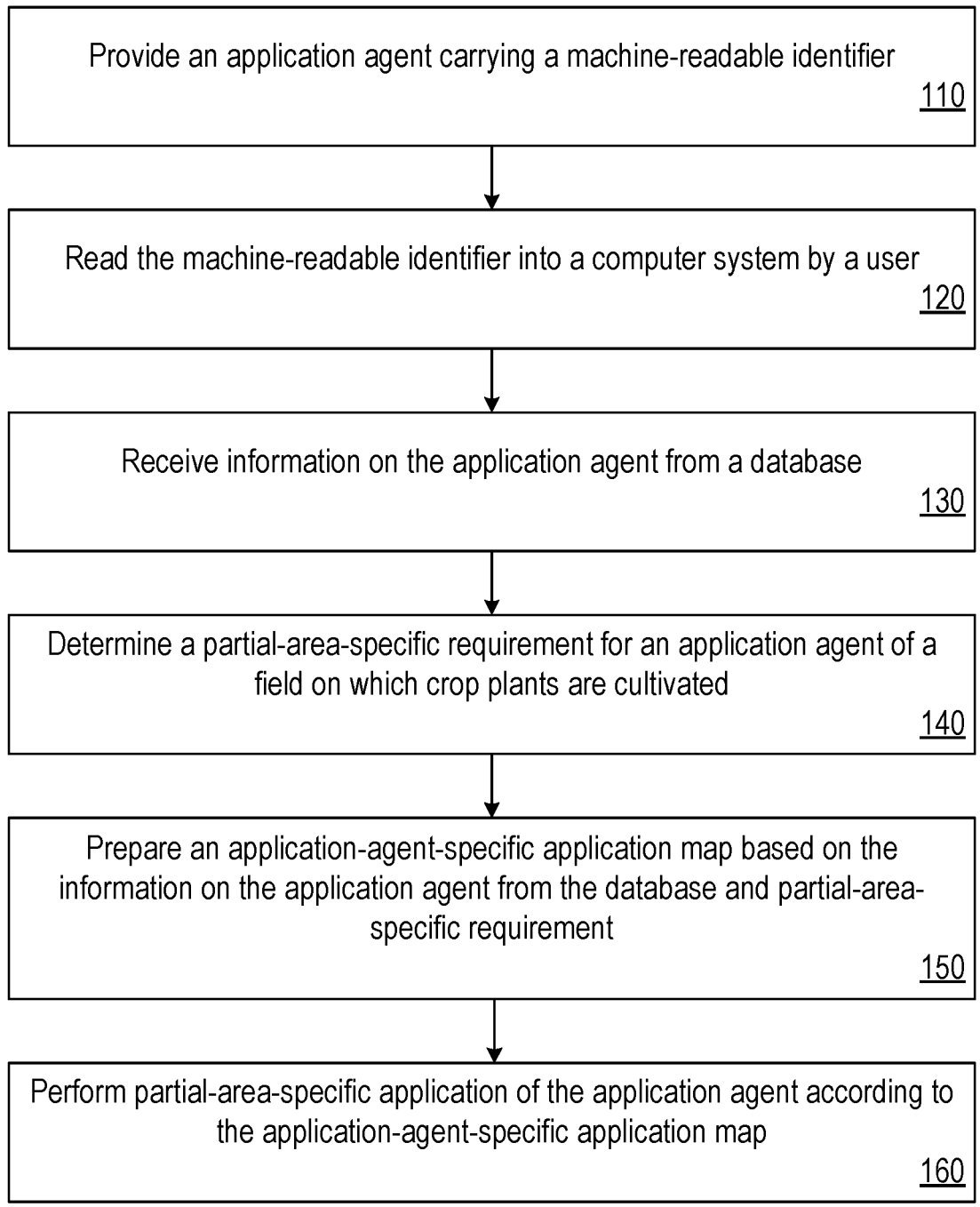

EFFICIENT USE OF PLANT PROTECTION AGENTS, NUTRIENTS, AND THE LIKE IN THE GROWING OF CULTIVATED PLANTS

CROSS-REFERENCE TO RELATED APPLICATIONS

This application is a national stage application (under 35 U.S.C. § 371) of PCT/EP2017/072739, filed Sep. 11, 2017, which claims benefit of European Application No. 16189255.9, filed Sep. 16, 2016, both of which are incorporated herein by reference in their entirety.

TECHNICAL FIELD

The present invention relates to the efficient use of application agents in the cultivation of crop plants.

BACKGROUND

Land cultivation measures that are adapted to the variability of the location and stock parameters are combined under the designations "precision farming" and "partial-field-related farming."

The increasing availability of positioning systems such as GPS (global positioning systems) and space-related detection and evaluation systems such as GIS (geographic information systems) has made such measures increasingly widespread in recent years.

Using remote sensing systems, it is possible to recognize differences in an agriculturally exploited field and to represent the differences in zone maps. Such a map can provide information as to how variable a field can be with respect to its productivity. Areas having similar potential are combined into one zone. The intensity of cultivation is then varied in accordance with the zones.

Environmental regulations and rising prices for operating equipment make efficient and targeted use of resources necessary. By using so-called application maps based on the zones, one can optimize the use of seeds, fertilizers and plant protection agents in a partial-area-specific manner.

The preparation and use of such application maps is described for example in the publications U.S. Pat. No. 5,915,313 and US 2006282228 A.

BRIEF DESCRIPTION OF THE DRAWINGS

The FIGURE is a flow chart illustrating a method for preparing an application map in accordance with an embodiment of the present invention.

DESCRIPTION

Application maps are prepared based on the requirement determined in a partial-area-specific manner. As a rule, application-agent-specific information is not taken into consideration in preparing application maps.

Plant protection agents may be subject to restrictions on use in some countries; for example, some plant protection agents can be used only at specified times, at specified locations, for a specified purpose and/or in a specified amount.

It would be advantageous if such information could be taken into account in preparing application maps.

The amounts of application agents should be recorded in an application map in a partial-area-specific manner. As a rule, there will be a partial area that has a higher requirement for application agents than another area. Such an additional requirement can be met by using a higher concentration of the active compound at the nozzle (mg/L) with the same application amount, or by using a greater application amount (L) with the same concentration of the active compound. For some application agents, however, it makes a difference whether one increases the concentration or the application amount. For example, the mechanism of action of a plant protection agent may require a minimum and/or a maximum concentration. It is possible that no action will occur if the concentration of the active compound in the plant protection agents is below a minimum level; it is also possible that the active compound will cause unwanted or increased side effects if a maximum concentration is exceeded.

It would therefore be advantageous if such information were taken into account in preparing an application map.

The weather can also play an important role for application. For example, application agents may be more rapidly broken down or exert a different action in direct sunlight, e.g. unwanted side effects may occur. Accordingly, the amount and/or concentration of an application agent would have to be adapted to the weather prevailing during application.

It would be advantageous if weather information were taken into account in preparing the application map.

The publication by Martin Schreiber et al. entitled "Vereinfachung des Pjlanzenschutzprozesses Burch Datenintegration and Automation—Das Projekt PAM [Simplification of the Plant Protection Process through Data Integration and Automation—The PAM Project]", which was made available to the public in connection with the 35th GIL annual conference of 2015 (23-24 Feb. 2015) (http://www.gil-net.de/Publikationen/27161.pdf), discloses the planning and implementation of plant protection applications by merging and integrating a set of data from different sources. The planning also comprises the accessing of manufacturer-specific instructions for use of the plant protection agent (cf. Item 2.5), but these data are not included in the preparation of application maps (cf. FIG. 2).

Based on the prior art described, the technical object of the invention is to further increase efficiency in the use of application agents.

According to the invention, this object is achieved by means of the subject matter of independent claims 1, 2, 9, 10, 11 and 12. Preferred embodiments are found in the dependent claims and in the present description.

A first subject matter of the present invention is thus a method for preparing an application map, comprising the following steps:

(A) providing an application agent carrying a machine-readable identifier, (B) reading of the machine-readable identifier into a computer system by a user, (C) receiving information on the application agent from a database, (D) determining a partial-area-specific requirement for application agents of a field on which crop plants are cultivated, and (E) preparing an application-agent-specific application map based on the information on the application agent from the database and the partial-area-specific requirement.

A further subject matter of the present invention is a method for cultivating crop plants in a field, characterized by the following steps:

(A) providing an application agent carrying a machine-readable identifier, (B) reading of the machine-readable identifier into a computer system by a user, (C) receiving information on the application agent from a database, (D) determining a partial-area-specific requirement for application agents of the field in which the crop plants are cultivated, (E) preparing an application-agent-specific application map based on the information on the application agent from the database and the partial-area-specific requirement of the field in which the crop plants are cultivated, and (F) partial-area-specific application of the application agent according to the application-agent-specific application map.

A further subject matter of the present invention is a computer program product comprising a data carrier on which a computer program is stored, which can be read into the working memory of a computer and causes the computer system to carry out the following steps:
 (a) reading a machine-readable identifier of an application agent into the working memory of the computer system,
 (b) determining information on the application agent from a database and reading the information into the working memory of the computer system,
 (c) reading a zone map for a field in which crop plants are cultivated into the working memory of the computer system, wherein for individual partial areas of the field a requirement of the partial areas for treatment with an application agent is indicated in the zone map,
 (d) preparing a partial-area-specific and application-agent-specific application map based on the information determined from the database on the application agent and based on the partial-area-specific requirement determined, and
 (e) outputting the prepared application map.

A further subject matter of the present invention is a system for preparing application-agent-specific application maps comprising
 I. an application agent carrying a machine-readable identifier,
 II. a reading unit for reading the machine-readable identifier into a computer system,
 III. a database in which information on the application agent is stored,
 IV. a zone map for a field in which crop plants are cultivated, wherein for individual partial areas of the field a requirement of the partial areas for treatment with an application agent is indicated in the zone map, and
 V. a computer system with a working memory into which a computer program can be loaded, wherein the computer system is configured such that based on the zone map and the information on the application agent, it creates an application-agent-specific application map that indicates for individual partial areas how the application agent is to be applied.

A further subject matter of the present invention is an application-agent-specific application map, wherein the application map is a digital representation of a field on which crop plants are cultivated, wherein the application map indicates, for individual partial areas of the virtual representation of the field, how an application agent is to be applied.

A further subject matter of the present invention is the use of the system according to the invention, the computer program product according to the invention and/or the application map according to the invention for efficiently using one or a plurality of application agents in the cultivation of crop plants.

The invention is described in further detail below without distinguishing among the subject matter of the invention (method, system, computer program product, application map, use). Rather, the following explanations apply analogously to all subject matter of the invention regardless of the context in which they occur (method, system, computer program product, application map, use).

Therefore, when the "method according to the invention" is mentioned below, this refers both to the method for preparing an application map and the method for cultivating crop plants.

The method according to the invention comprises a first step in which an application agent is provided (step (A)).

An application agent is generally understood to be an agent that is used in the cultivation of crop plants in order to ensure and/or increase a crop yield.

Examples of application agents are fertilizers or other nutrients and plant protection agents. Preferably, the application agent is a plant protection agent.

A plant protection agent is understood to refer to a product that contains an active compound or a plurality of active compounds.

The term "active compounds" refers to substances that have a specific action and induce a specific reaction in an organism.

The plant protection agent is used for protecting plants or plant products from harmful organisms or preventing the action thereof, destroying unwanted plants or plant parts, inhibiting the unwanted growth of plants or preventing such growth, and/or in another manner as nutrients for affecting the physiological processes of plants (e.g. growth regulators).

Preferred examples of plant protection agents are herbicides, fungicides and pesticides (such as insecticides).

The term "crop plant" is understood to refer to a plant that is cultivated by human intervention in a targeted manner as a useful or ornamental plant.

The term "field" is understood to refer to a spatially delimitable area of the Earth's surface that is agriculturally used in that crop plants are cultivated, provided with nutrients and harvested in such a field.

The application agent can be solid, liquid or gaseous. Moreover, it can be a pure substance or a homogeneous or heterogeneous mixture. Examples of heterogeneous mixtures are emulsions, suspensions or aerosols.

Ordinarily, the application agent is a liquid under STP conditions (standard pressure and temperature). Ordinarily, the application agent is an active compound formulation that in addition to the active compound (or a plurality of active compounds) also contains further substances, such as e.g. a carrier substance (for diluting the active compound), and optionally dispersants for dispersing the active compound in the carrier substance. Further substances such as buffers, preservatives, dyes, antioxidants, etc. are conceivable as components of an application agent.

As a rule, the application agent is purchased by a user.

The application agent carries a machine-readable identifier. "Machine-readable" means that the identifier is in a format in which it can be interpreted by a computer system.

The term "identifier" is understood to refer to data that are clearly connected with the carrier of the identifier. The identifier thus allows a conclusion to be drawn with respect to the carrier of the identifier (the application agent in the present case).

In principle, one can distinguish between two different types of identifiers. An individual identifier is understood to refer to an identifier that is unique to the carrier: each carrier carries a unique identifier by means of which it can be distinguished from another carrier. A type-specific identifier is understood to be an identifier that is identical for all carriers of the same type, but is different from the identifier of another type. By means of the type identifier, one can thus recognize the type of an application agent, but not of a single individual. By means of an individual identifier, one can determine a single individual; however, using an individual identifier, it is of course also possible to determine the type of the present application agent.

The machine-readable identifiers of the present invention can be individual identifiers or type-specific identifiers.

A typical and preferred example of a format in which the machine-readable identifiers can be present is an optoelectronically readable code such as e.g. a barcode (e.g. Codabar, Code 128, etc.), a 2D code (e.g. Codablock, Code 49, etc.) or a matrix code (e.g. DataMatrix, MaxiCode, Aztec code, QR code, etc.).

Preferably, the machine-readable identifier is in the form of a matrix code.

The advantage of a matrix code over a barcode or 2D code lies in the greater amount of data available per unit area.

Moreover, a matrix code has the advantage of being readable by the smartphones currently available without requiring any further hardware. Such smartphones are extremely widespread; they are equipped with a camera unit by means of which a matrix code can be represented on an image sensor, and programs can be installed on the smartphone by means of which a matrix code represented on the image sensor can be read into the working memory of the smartphone and interpreted there.

However, it is also conceivable for the machine-readable identifier to be stored on an electronic chip (ICC) from which it can be read with or without contacts. An RFID tag or an NFC chip is conceivable.

The machine-readable identifier—depending on the format in question—can be attached to the application agent in various ways. For example, in the case of an optoelectronically readable identifier, it should preferably be printed on a package (bottle, container, box, etc.) that contains the application agent. It is also conceivable that the identifier is printed on a package insert.

If the machine-readable identifier is present on an electronic chip, the chip can adhere to the package containing the application agent.

In an embodiment of the present invention, the machine-readable identifier is not accessible by a user until the application agent has been commercially purchased as a product and a step has been carried out that ordinarily can only be carried out after the application agent has been acquired. This applies in particular in cases where the machine-readable identifier can only be used once, for example in order to prepare and/or export an application-agent-specific application map (single use of an identifier is described in further detail below).

For example, it is conceivable that the machine-readable identifier is located under a sealing film and the user must first remove or open the sealing film before the identifier can be accessed. However, removal or opening of the sealing film is an irreversible process that leaves visible traces. For example, it is possible that after removing and/or opening the sealing film, the user is obligated to purchase the application agent. A potential buyer of an application agent determines by checking the sealing film whether the identifier has already been accessed. By using a sealing film or similar mechanisms, one can therefore ensure that an application agent must first be purchased before the purchaser can read in (and use) the identifier.

In a second step (step (B) of the method according to the invention), the machine-readable identifier is read by a user into a computer system. Step (B) is carried out after step (A).

If the machine-readable identifier is present in the form of an optoelectronically readable code (e.g. in the form of a matrix code), the user can use a commercial scanner or a camera unit in order to read the code. He or she can also use a smartphone, which as described above can be seen as a mobile computer system that can read in and interpret the code using a camera unit that is part of the smartphone and correspondingly installed software. A further possibility lies in the use of a tablet computer or a notebook. It is also conceivable to use video glasses to read in an optoelectronically readable code.

According to step (B) of the method according to the invention, a machine-readable identifier is read into a computer system. This computer system can be the computer system that is used in step (E) of the method according to the invention to prepare an application map. However, it can also be a separate computer system that is used only for reading in the identifier and optionally querying a database according to step (C) of the method according to the invention.

Of decisive importance is only that the information on the application agent received from a database by means of the identifier (step (C)) is ultimately present on the computer system with which an application-agent-specific application map is prepared (step (E)).

As the computer systems of today can be networked in a different manner and information can thus simply be transmitted from one computer system to another computer system, with the latter computer being used for reading in the information, it is not important which computer system is used for this reading in, provided that the information required for preparing the application-agent-specific application map is ultimately present in the computer system used for this preparation.

Step (C) of reading in serves to inform the respective computer used which application agent is present (e.g. was acquired).

If the machine-readable identifier is a type-specific identifier, the computer system used now has the information as to which type of application agent is present.

If the machine-readable identifier is an individual identifier, the computer system used also has the information as to which specific (individual) container of the application agent is present.

For the following step (step (C) of the method according to the invention), in an embodiment of the present invention, only the information as to which type is present is important.

Based on the type information, the computer system used receives information on the type of application agent from a database. The information can be the following:
  dosing information,
  maximum usable concentration of the application agent,
  minimum usable concentration of the application agent,
  optimum concentration range of the application agent,
  maximum usable amount of the application agent (amount applied per unit area), legal and/or official and/or quality assurance limitations on use and/or prohibitions of use for the application agent, e.g. with respect to the location of application or the time of application, interactions of the application agent with other application agents, times at which the application agent should or may not be used, times at which the application agent should preferably be used, environmental conditions (humidity, temperature, sunlight etc.) that favorably affect the action of the application agent, environmental conditions (humidity, temperature, sunlight etc.) that have a harmful effect on the action of the application agent, etc.

The database is either part of the computer system that was used to read in the machine-readable identifier and/or on which the preparation of the application-agent-specific application map takes place, or it is a part of a further computer system to which the aforementioned computer system and/or computer systems is/are connected.

In a further step (step (D)) of the method according to the invention, the partial-area-specific requirement for the application agent of a field in question on which crop plants are cultivated is determined.

Step (D) can be carried out before, during and/or after steps (A), (B) and (C).

The field is ordinarily the field of a user or the field of a person for whom the user is active or on behalf of whom the user takes care of matters concerning the field.

The requirement of a partial area for treatment of said partial area (or the crop plants cultivated there) with one (or more) application agent(s) can e.g. therefore result from the fact that too few nutrients are present and/or a pest has occurred or there is a risk that it will occur. For this reason, instead of a "partial-area-specific requirement," one could also speak of a "partial-area-specific nutrient deficit" or a "partial-area-specific infestation or infestation risk."

The partial-area-specific requirement is preferably determined using sensors in and/or over the field.

For example, it is conceivable that the partial-area-specific requirement is determined from remote sensing data.

"Remote sensing data" are digital data obtained remotely, for example by satellites, from the earth's surface. The use of aircraft (unmanned (drones) or manned) to record remote sensing data is also conceivable.

Remote sensing data provide information on the state of the vegetation prevailing in the field (cf. for example M. S. Moran et al.: Opportunities and Limitations for Image-Based Remote Sensing in Precision Crop Management, Remote Sensing of Environment (1997) 61: 319-346).

For example, a vegetation index can be calculated from the remote sensing data. A known vegetation index is for example the normalized difference vegetation index (NDVI, also known as the normalized density vegetation Index). The NDVI is calculated from the reflectance values in the near infrared region and the red visible region of the light spectrum. The index is based on the fact that healthy vegetation reflects a relatively small amount of radiation in the red region of the visible spectrum (wavelength of approximately 600 to 700 nm) and a relatively large amount of radiation in the adjacent near infrared region (wavelength of approximately 700 to 1300 nm). This reflectance in the near infrared region is attributable to the presence of chlorophyll. A low NDVI may be a sign of a disease. It is also conceivable that one can conclude from an elevated NDVI that weeds and/or weed grasses are present. As a rule, a plurality of data are used to make a definitive statement on the partial-area-specific state of a field or vegetation within the field and to allow a partial-area-specific state to be derived therefrom.

As a further possible vegetation index, the weighted difference vegetation index (WDVI) can also be determined from the remote sensing data, as proposed in US2016/0171680A1, and this can be correlated with the leaf area index (LAI). Further usable indices are known to the person having ordinary skill in the art.

Instead of or as a complement to remote sensing data, information can also be obtained by means of sensors in the field. For example, the use of a so-called N sensor, which can also determine an NDVI, is also conceivable.

The use of sensors for detecting a pest infestation is also conceivable. The use of traps that are set up at different locations in the field can also make a partial-area-specific infestation recognizable.

It is also conceivable to use prediction models that predict pest infestations for determining a partial-area-specific requirement. Such prediction models are extensively described in the prior art and are also commercially available. The decision support system proPlant Expert (Newe et al. 2003, Johnen et al. 2010; www.proPlantexpert.com) carries out predictions using data on the cultivated crop (development stage, growth conditions, plant protection measures), the weather (temperature, sunshine duration, wind speed, precipitation) and the known pests/diseases (economic limit values, pest/disease pressure). These data are used to estimate an infestation risk and make a recommendation on the time of treatment and the plant protection agent and prepare an assessment of past protection measures.

Further methods for determining a partial-area-specific requirement of a field with crop plants are described in the prior art (cf. e.g. WO2016/090212, US2016/0171680A1, U.S. Pat. No. 6,199,000, US2009/0132132A1, WO00/23937).

The result of step (D) of the method according to the invention is ordinarily a zone map. A zone map is a digital representation of a field on which crop plants are cultivated. On the zone map, the digital representation of the field is subdivided into partial areas. For individual partial areas, the requirement of said partial areas (or the crop plants cultivated there) for treatment with one (or more) application agent(s) is specified. A corresponding requirement is preferably specified for each partial area (zone).

Segmentation of the virtual representation of the field into partial areas is carried out in such a way that partial areas having a similar requirement are created. Segmentation takes place by means of one or a plurality of parameters that represent the requirement of the field (or the crop plants cultivated in the field). The purpose of segmentation is preferably to minimize the differences within a partial area with respect to the requirement present and to maximize the differences among the partial areas. Segmentation can be carried out according to known mathematical methods such as e.g. the Jenks-Caspall algorithm or other algorithms known to the person having ordinary skill in the art.

It is also conceivable that the information on the partial-area-specific requirement of a field for one or a plurality of application maps is already present in the form of a "finished" zone map. For example, it is conceivable that such zone maps can be acquired from a commercial vendor. In such a case, step (D) of the method according to the invention is to be understood such that a zone map is provided wherein for individual partial areas of the field a requirement of the partial areas for treatment with an application agent is indicated in the zone map. Such a zone map is then (directly or indirectly) read by a user into the computer system that is used in step (E) of the method according to the invention for preparing the application-agent-specific application map.

In a further step, the information collected in steps (C) and (D) is merged. It is then available in a computer system with which an application-agent-specific application map is prepared (step (E) of the method according to the invention).

Step (E) is carried out after steps (A), (B), (C) and (D).

Step (E) is carried out using a computer program that can be read into the working memory of the computer system, where it can be executed.

By means of the computer program, the partial-area-specific requirement is first preferably determined by reading in of the zone map prepared in step (D), after which it is determined which type of application agents are suitable for meeting this requirement.

For example, if a pest infestation is detected, a determination is made as to which plant protection agents can be used for pest control. This is carried out as a rule by querying corresponding entries in application agent databases.

The result of this query is a list of application agent types (products) that are useable for meeting the determined requirement.

Using the machine-readable identifier, it can be determined whether the user has one of the application agents available that was included in the list of usable application agents.

Using information detected on the application agent present, one can determine which conditions apply for application of the application agent. Based on the partial-area-specific requirement and the conditions for use of the available application agent, it is then possible to prepare an application-agent-specific application map that indicates for individual partial areas of the field whether and how the application agent is to be used.

The application map is a digital representation of the field. The application map indicates on which partial areas of the field and in what dosage (amount, concentration) one or a plurality of application agents should be used. The application map takes into account both the partial-area-specific requirement and the specifics of the application agent to be used and is therefore both partial area specific and application agent specific.

According to the invention, the determination of application-agent-specific information from a database is linked to the previous reading of an identifier associated with the application agent. In principle, it would be possible, after determination of a partial-area-specific requirement, to indicate to a user a list of usable application agents that could be used to meet the requirement. The user could then select an application agent from the list, and the application-agent-specific information on the selected application agent could then be received from a database. However, such an approach is disadvantageous compared to the approach according to the invention. For example, it may be that multiple possible application agents are indicated and the user then selects one from the list that does not match what he or she has in the warehouse. In such a case, the incorrect application-agent-specific information would be included in the preparation of the application map.

According to the invention, such errors are prevented in that rather than requiring the user to make a selection, the correct application-agent-specific information is automatically received when the machine-readable identifier is read in.

It is further conceivable that the commercial distributor of a computer program product according to the invention is not the distributor of the application agent. In such cases, difficulties may arise with respect to questions of liability. Who would be liable for damage resulting from faulty application? The distributor of the computer program product with which the application map was prepared, or the distributor of the application agent, or the vendor of the database with application-agent-specific information?

In order to avoid such conflicts, in an embodiment of the invention, the computer program is configured such that an application map is prepared only if the user has read in a machine-readable identifier in advance.

In a preferred embodiment, the preparation of an application map is linked to the presence of an individual identifier. Only after an individual identifier has been read in is it possible to prepare and/or export an application map.

The computer program can be configured such that, with a single individual identifier, it is only possible to produce and/or export a single application map. After the preparation and/or exporting of an application map, the individual identifier would then be "used up."

In addition to the application-agent-specific information, further information that influences the efficacy of the application agent or the application process can also be included in preparation of the application-agent-specific application map. For example, it is conceivable to use weather information (predictions) at the time of a planned application. As described above, it may be that the application has to be adapted to the respective prevailing weather situation in order to achieve the best effect possible. Accordingly, in an embodiment of the present invention, the weather situation on a planned application date is determined, and the amount and/or concentration and/or formulation of the application agent and/or time of application and/or another application parameter is adapted to the prevailing weather.

It is also conceivable based on the weather information (predictions) to determine an optimum time for applying the selected application agent.

An application map that includes information on the weather expected (predicted) for the application period is also referred to here as a weather-specific application map.

If, in addition to information on the application agent, further information that influences the efficacy of the application agent or the application process is included in preparation of the application map, the prepared application map is also referred to in this case as an application-specific application map. A weather-specific and application-agent-specific application map is an example of such an application-specific application map.

In a preferred embodiment, the digital application map or parts thereof can be loaded into the working memory of an application device.

An application device is understood to refer to a mechanical device for applying an application agent to a field. As a rule, such an application device comprises at least one container for accommodating at least one application agent, a spraying device by means of which the application agent can be dispensed on the field and a control device used to control the feeding of the at least one application agent from its container in the direction of the spraying device. Accordingly, the digital application map is preferably loaded into the working memory of the control unit. In addition, the control unit is preferably connected to a position-determining system that determines the position of the application device in the field. Preferably, the control device initiates the application process in the corresponding manner when it is recorded on the digital application map that application is to take place at a location and when the position-determining system reports that the application device is at said location.

It is conceivable that a user can export a prepared application map to a mobile data carrier, by means of which the application map can be transported to an application device where it can be read into the control unit. However, it is also conceivable for the user to be able to wirelessly transmit a prepared application map from the computer system on which it was prepared to the control unit of the application device.

In the method according to the invention for cultivating crop plants, the use of the prepared application map, i.e. partial-area-specific application of the application agent according to the application-agent-specific application map, is a further step (step (F)) that is carried out after steps (A) to (E).

The FIGURE is a flow chart illustrating a method for preparing an application map in accordance with an embodiment of the present invention. At block 110, an application agent carrying a machine-readable identifier is provided. At block 120, the machine-readable identifier is read into a computer system by a user. At block 130, information on the application agent is received from a database. At block 140, a partial-area-specific requirement is determined for an application agent of a field on which crop plants are cultivated. At block 150, an application-agent-specific application map is prepared based on the information on the application agent from the database and partial-area-specific requirement. At block 160, partial-area-specific application of the application agent is performed according to the application-agent-specific application map.

LITERATURE

Newe M., Meier H., Johnen A., Volk T. 2003. proPlant expert.com—an online consultation system on crop protection in cereals, rape, potatoes and sugarbeet. EPPO Bulletin 33, 443-449.

Johnen A., Williams I. H., Nilsson C., Klukowski Z., Luik A., Ulber B. 2010. The proPlant Decision Support System: Phenological Models for the Major Pests of Oilseed Rape and Their Key Parasitoids in Europe. In: Biocontrol-Based Integrated Management of Oilseed Rape Pests. Ed.: Ingrid H. Williams. Tartu 51014, Estonia. ISBN 978-90-481-3982-8. p. 381-403.

The invention claimed is:

1. A method for preparing an application map, comprising the following steps:
   (A) providing an application agent carrying a machine-readable identifier,
   (B) reading of the machine-readable identifier into a computer system by a user,
   (C) receiving information on the application agent from a database,
   (D) detecting, using one or more field sensors, a pest infestation of a field on which crop plants are cultivated,
   (E) determining, using a normalized difference vegetation index, a weighted difference vegetation index, and the detected pest infestation, a partial-area-specific requirement for an application agent of the field, wherein the normalized difference vegetation index and the weighted difference vegetation index are determined from remote sensing data, and
   (F) preparing an application-agent-specific application map based on the information on the application agent from the database and the partial-area-specific requirement, wherein the application-agent-specific application map is segmented into partial areas based on a plurality of parameters associated with the partial-area-specific requirement, the application-agent-specific application map comprising indications of concentration and amount of the application agent to be applied to the partial areas of the field, wherein the concentration and the amount of the application agent are computed based at least partially on received weather information.

2. The method according to claim 1, wherein the application agent is a plant protection agent.

3. The method according to claim 1, wherein the machine-readable identifier is in the form of an optoelectronically readable barcode, 2D code or matrix code.

4. The method according to claim 1, wherein the machine-readable identifier is an individual identifier.

5. The method according to claim 1, wherein the information in step (C) is one or more types of information from the following list:
   dosing information,
   maximum usable concentration of the application agent,
   minimum usable concentration of the application agent,
   maximum usable amount of the application agent,
   legal and/or official and/or quality assurance limitations on use and/or prohibitions of use for the application agent with respect to the location of application or the time of application and/or
   interactions of the application agent with other application agents.

6. The method according to claim 1, wherein, with an individual identifier, only a single application-agent-specific application map can be prepared and/or output.

7. The method according to claim 1, wherein the application agent is a herbicide, fungicide, or pesticide.

8. A method for cultivating crop plants in a field, comprising the following steps:
   (A) providing an application agent carrying a machine-readable identifier,
   (B) reading of the machine-readable identifier into a computer system by a user,
   (C) receiving information on the application agent from a database,
   (D) detecting, using one or more field sensors, a pest infestation of a field on which crop plants are cultivated,
   (E) determining, using a normalized difference vegetation index, a weighted difference vegetation index, and the detected pest infestation, a partial-area-specific requirement for an application agent of the field, wherein the normalized difference vegetation index and the weighted difference vegetation index are determined from remote sensing data,
   (F) preparing an application-agent-specific application map based on the information on the application agent from the database and the partial-area-specific requirement of the field on which the crop plants are cultivated, wherein the application-agent-specific application map is segmented into partial areas based on a plurality of parameters associated with the partial-area-specific requirement, the application-agent-specific application map comprising indications of concentration and amount of the application agent to be applied to the partial areas of the field, wherein the concentration and the amount of the application agent are computed based at least partially on received weather information, and (G) partial-area-specific application of the application agent according to the application-agent-specific application map.

9. A non-transitory storage medium on which a computer program is stored, which can be read into the working memory of a computer and causes the computer system to carry out the following steps:

(a) reading a machine-readable identifier of an application agent into the working memory of the computer system, (b) determining information on the application agent from a database and reading the information into the working memory of the computer system, (c) reading a zone map for a field in which crop plants are cultivated into the working memory of the computer system, wherein for individual partial areas of the field a requirement of the partial areas for treatment with an application agent is indicated in the zone map, wherein the requirement of the partial areas for treatment is determined using a normalized difference vegetation index, a weighted difference vegetation index, and a pest infestation of the field, wherein the pest infestation is detected using one or more field sensors, and wherein the normalized difference vegetation index and the weighted difference vegetation index are determined from remote sensing data, (d) preparing a partial-area-specific and application-agent-specific application map based on the information determined from the database on the application agent and based on a partial-area-specific requirement determined, wherein the partial-area-specific and application-agent-specific application map is segmented into partial areas based on a plurality of parameters associated with the partial-area-specific requirement, the application-agent-specific application map comprising indications of concentration and amount of the application agent to be applied to the partial areas of the field, wherein the concentration and the amount of the application agent are computed based at least partially on received weather information, and (e) outputting the prepared application map.

10. A system for preparing application-agent-specific application maps comprising I. an application agent carrying a machine-readable identifier, II. a reading unit for reading the machine-readable identifier into a computer system, III. a database in which information on the application agent is stored, IV. a zone map for a field in which crop plants are cultivated, wherein for individual partial areas of the field a requirement of the partial areas for treatment with an application agent is indicated in the zone map, wherein the requirement of the partial areas for treatment is determined using a normalized difference vegetation index, a weighted difference vegetation index, and a pest infestation of the field, wherein the pest infestation is detected using one or more field sensors, and wherein the normalized difference vegetation index and the weighted difference vegetation index are determined from remote sensing data, and V. a computer system with a working memory into which a computer program can be loaded, wherein the computer system is configured such that, based on the zone map and the information on the application agent, it creates an application-agent-specific application map that indicates for individual partial areas how the application agent is to be applied, wherein the application-agent-specific application map is segmented into partial areas based on a plurality of parameters associated with the requirement of the partial areas for treatment, wherein the application-agent-specific application map comprises indications of concentration and amount of the application agent to be applied to the partial areas of the field, and wherein the concentration and the amount of the application agent are computed based at least partially on received weather information.

11. A process comprising cultivating crop plants utilizing the system according to claim 10 for efficiently using one or a plurality of application agents in the cultivation of crop plants.

12. A non-transitory storage medium on which a computer program is stored, which can be read into the working memory of a computer and comprises:

an application-agent-specific application map, wherein the application map is a digital representation of a field on which crop plants are cultivated, wherein the application map is segmented into individual partial areas based on a plurality of parameters associated with a requirement for treatment of the field, the requirement for treatment of the field determined using a normalized difference vegetation index, a weighted difference vegetation index, and a pest infestation of the field detected using one or more field sensors, wherein the normalized difference vegetation index and the weighted difference vegetation index are determined from remote sensing data, wherein the application map indicates, for the individual partial areas of the digital representation of the field, how an application agent is to be applied, and wherein the application map comprises indications of concentration and amount of the application agent to be applied to the individual partial areas, wherein the concentration and the amount of the application agent are based at least partially on weather information.

\* \* \* \* \*